(12) United States Patent
Barman et al.

(10) Patent No.: US 8,775,496 B1
(45) Date of Patent: Jul. 8, 2014

(54) CIRCUITS AND METHODS FOR CALCULATING A CHOLESKY DECOMPOSITION OF A MATRIX

(75) Inventors: Kaushik Barman, Hyderabad (IN); Raghavendar M. Rao, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 535 days.

(21) Appl. No.: 13/194,360

(22) Filed: Jul. 29, 2011

(51) Int. Cl.
*G06F 7/32* (2006.01)

(52) U.S. Cl.
USPC .......................................................... 708/520

(58) Field of Classification Search
CPC ..... G06F 7/5525; G06F 7/535; G06F 7/4873; G06F 7/49936; G06F 7/49957; G06F 2101/12; G06F 2207/5522; G06F 17/16; G06F 15/8076; G06F 15/8092; G06F 7/4806; G06F 9/30036; G06F 7/552
USPC ................................. 708/520, 500, 502, 605
See application file for complete search history.

(56) References Cited

U.S. PATENT DOCUMENTS

| | | | |
|---|---|---|---|
| 8,396,914 B1* | 3/2013 | Langhammer | 708/520 |
| 2011/0238720 A1* | 9/2011 | Langhammer et al. | 708/605 |
| 2013/0138712 A1* | 5/2013 | Mazahreh et al. | 708/520 |

OTHER PUBLICATIONS

Press, William, et al., 1992, *Numerical recipes in C: The Art of Scientific Computing (second edition)* Cambridge University Press, pp. 96-98, section 2.9, ISBN 0-521-43108-5.

* cited by examiner

*Primary Examiner* — Tan V. Mai
(74) *Attorney, Agent, or Firm* — LeRoy D. Maunu (57) ABSTRACT

Approaches for Cholesky decomposition of a matrix are described. A first circuit is configured to generate an inverse square root of an input value. A second circuit is configured to generate a product of a value output by the first circuit and provided at a first input and a value provided at a second input. A third circuit is configured to generate a difference between a value provided at the first input and a value provided at the second input of the third circuit. The first input of the third circuit is coupled to the output of the second circuit. A control circuit is configured to iteratively distribute a plurality of values of the matrix and the outputs of the first, second, and third circuits to the inputs of the first, second, and third circuits such that the Cholesky decomposition of the matrix is output by the third circuit.

18 Claims, 7 Drawing Sheets

| | Control | Operation | |
|---|---|---|---|
| | | inverted diagonal elements | non-inverted diagonal elements |
| 302 | R | State = $1/\sqrt{B}$<br>L = $1/\sqrt{B}$ | State = $1/\sqrt{B}$<br>L = $\sqrt{B}$ |
| 304 | M | State unchanged<br>L = State × B | State unchanged<br>L = State × B |
| 306 | Q | State = A*<br>L = B − A × A* | State = A*<br>L = B − A × A* |
| 308 | T | State unchanged<br>L = B − State × A | State unchanged<br>L = B − State × A |

FIG. 4

| Clock cycle | Control | Read B | Read A | Write |
|---|---|---|---|---|
| 0 | R | 1,1 | | |
| ⋮ | | | | |
| 20 | M | 2,1 | | 1,1 |
| 21 | M | 3,1 | | |
| 22 | M | 4,1 | | |
| ⋮ | | | | |
| 25 | | | | |
| 26 | | | | 2,1 |
| 27 | Q | 2,2 | 2,1 | 3,1 |
| 28 | T | 3,2 | 3,1 | 4,1 |
| 29 | T | 4,2 | 4,1 | |
| 30 | Q | 3,3 | 3,1 | |
| 31 | T | 4,3 | 4,1 | |
| 32 | Q | 4,4 | 4,1 | |
| 33 | | | | 2,2 |
| 34 | R | 2,2 | | 3,2 |
| 35 | | | | 4,2 |
| 36 | | | | 3,3 |
| 37 | | | | 4,3 |
| 38 | | | | 4,4 |
| ⋮ | | | | |
| 54 | M | 3,2 | | 2,2 |
| 55 | M | 4,2 | | |
| ⋮ | | | | |

CIRCUITS AND METHODS FOR CALCULATING A CHOLESKY DECOMPOSITION OF A MATRIX

FIELD OF THE INVENTION

One or more embodiments generally relate to matrix decomposition and more particularly to Cholesky decomposition.

BACKGROUND

Matrix decomposition refers to the transformation of a given matrix into a canonical form. The decomposition process is also known as matrix factorization. Matrix decomposition is utilized in many applications to solve linear algebraic systems. Several decomposition methods, such as QR decomposition, factorize a matrix into arbitrary Q and R matrices. Cholesky decomposition is a particularly efficient method for decomposing matrices that are symmetric and are positive definite. When these conditions are true, the matrix will decompose into two triangular matrices that are the Hermitian transpose of one another. Cholesky decomposition constructs a lower triangular matrix L whose Hermitian transpose $L^H$ can itself serve as the upper triangular part, hence it is also called the square-root decomposition of a matrix. Cholesky decomposition is utilized in a number of communication and signal processing applications including but not limited to linear least square computation, non-linear optimization, Monte Carlo simulation, Kalman filtration, etc.

The disclosed embodiments address one or more issues arising from matrix decomposition.

SUMMARY

In one embodiment, a circuit is provided for calculating a Cholesky decomposition of a matrix. A first circuit has an input and an output and is configured to generate at the output, an inverse of a square root of an input value provided at the input of the first circuit. A second circuit has first and second inputs and an output. The second circuit is configured to generate at the output, a product of a value provided at the first input and a value provided at the second input. The first input of the second circuit is coupled to the output of the first circuit. A third circuit has first and second inputs and an output. The third circuit is configured to generate at the output, a difference between a value provided at the first input and a value provided at the second input. The first input of the third circuit is coupled to the output of the second circuit. A control circuit is coupled to the first, second, and third circuits. The control circuit is configured to iteratively distribute a plurality of values of the matrix and the outputs of the first, second, and third circuits to the inputs of the first, second, and third circuits. The output of the third circuit provides a plurality of values of the Cholesky decomposition of the matrix.

In another embodiment, a circuit for calculating a Cholesky decomposition of a matrix includes a memory configured for storing a first plurality of values for the matrix. A calculation circuit is coupled to the memory and is responsive to a control signal. The calculation circuit has first and second inputs and an output. In response to the control signal indicating a first operating state, the calculation circuit is configured to generate for each first value provided at the second input, an inverse of a square root of the first value, store the inverse square root value in a state register, and output the inverse square root value at the output. In response to the control signal indicating a second operating state, the calculation circuit is configured to generate for each first value provided at the second input, a first product of the inverse square root value stored in the state register and the first value, and output the first product at the output. In response to the control signal indicating a third operating state, the calculation circuit is configured to generate for each first value provided at the second input, a first difference between the first value and a square of a second value provided at the first input, store the second value in the state register, and output the first difference at the output. In response to the control signal indicating a fourth operating state, the calculation circuit is configured to generate for each first value provided at the second input, a second difference between the first value and a second product of the second value stored in the state register and a third value provided at the first input, and output the second difference at the output. A control circuit is coupled to the memory and to the calculation circuit. The control circuit is configured to generate the control signal for the calculation circuit. The control circuit is further configured to read the second and third values from the first plurality of values stored in the memory, and provide the first plurality of values to the second input and provide the second and third values to the first input.

A method for calculating a Cholesky decomposition of a matrix is provided in another embodiment. The method includes inputting each of a first plurality of values of the matrix to a circuit for calculating the Cholesky decomposition of the matrix. A control signal is generated to indicate one of a first, a second, a third, or a fourth operating state. In response to the control signal indicating the first operating state, an inverse square root value is generated from a first one of the input values, and the inverse square root value is stored in a state register. In response to the control signal indicating the second operating state, a first product is generated from the inverse square root value stored in the state register and the first one of the input values. In response to the control signal indicating the third operating state, a first difference between the first one of the input values and a square of a second one of the input values is generated and the second one of the input values is stored in the state register. In response to the control signal indicating the fourth operating state, a second difference between the first one of the input values and a second product of the second one of the input values stored in the state register and a third one of the input values is generated. The Cholesky decomposition of the matrix is output from the circuit.

It will be appreciated that various other embodiments are set forth in the Detailed Description and Claims which follow.

BRIEF DESCRIPTION OF THE DRAWINGS

Various aspects and advantages of the disclosed embodiments will become apparent upon review of the following detailed description and upon reference to the drawings in which:

FIGS. 5-1 and 5-2 together show the timing of the dataflow through a single-cell architecture for calculating a Cholesky decomposition of a matrix;

DETAILED DESCRIPTION

Cholesky decomposition is a method for matrix decomposition that is particularly suited for many applications in communications and signal processing. Matrix decomposition is generally performed as one step in a larger process, such as solving linear least squares problems. The decomposition step is often performed a large number of times and may limit throughput in high-speed applications. Many applications, such as 3GPP-LTE wireless communication, require a hardware implementation that is capable of matrix decomposition at high throughput. One or more embodiments provide an efficient and high-throughput implementation for performing a Cholesky decomposition.

Cholesky decomposition is a particularly efficient method for decomposing real matrices that are symmetric and are positive definite matrices, and decomposing complex matrices that are Hermitian and are positive semi-definite matrices. A real matrix is symmetric when each element in row i column j is equal to the element in row j column i. For Hermitian matrices, the elements in row i column j are equal to the complex conjugate of the element in row j column i (all real symmetric matrices are Hermitian). With positive definite or semi-definite Hermitian matrices, Cholesky decomposition exploits their fundamental symmetry to efficiently construct a lower triangular matrix L whose conjugate transpose is equal to the upper triangular matrix $L^H$.

For a Hermitian matrix A, Cholesky decomposition is defined as:

$$A=LL^H$$

where L is a lower triangular matrix. The matrix L is also called the square-root factor or decomposition of the matrix A. Cholesky decomposition may also be referred to as square-root decomposition and such terms may be used interchangeably herein.

After the square-root factor L is determined, the upper triangular matrix $L^H$ can be determined as the conjugate transposition of the lower triangular factor L. Example 1 shows pseudo-code of one method for computing the Cholesky decomposition of a matrix A.

EXAMPLE 1 for $k = 1:n$ if $A(k, k) < 0$, {matrix is not positive definite!}

$A(k, k) = \sqrt{A(k, k)}$

$A(k + 1 : n, k) = A(k + 1 : n, k) / A(k, k)$ for $j = k + 1 : n$,

$A(j:n, j) = A(j:n, j) - A(j:n, k)A(j, k)$     end end As illustrated in Example 1, processes of Cholesky decomposition may be performed in a nested-column order in which the elements of the lower triangular matrix L are calculated such that the each newly computed element is expressed in terms of elements which have already been computed. In this example, the outer for loop iterates through the columns from left to right with index k. In each column k, the eigenvalue elements of lower triangular matrix L (referred to as diagonal elements herein) are first computed. The inner for loop determines elements of a column located in each row j below the determined diagonal element.

Figure 1:
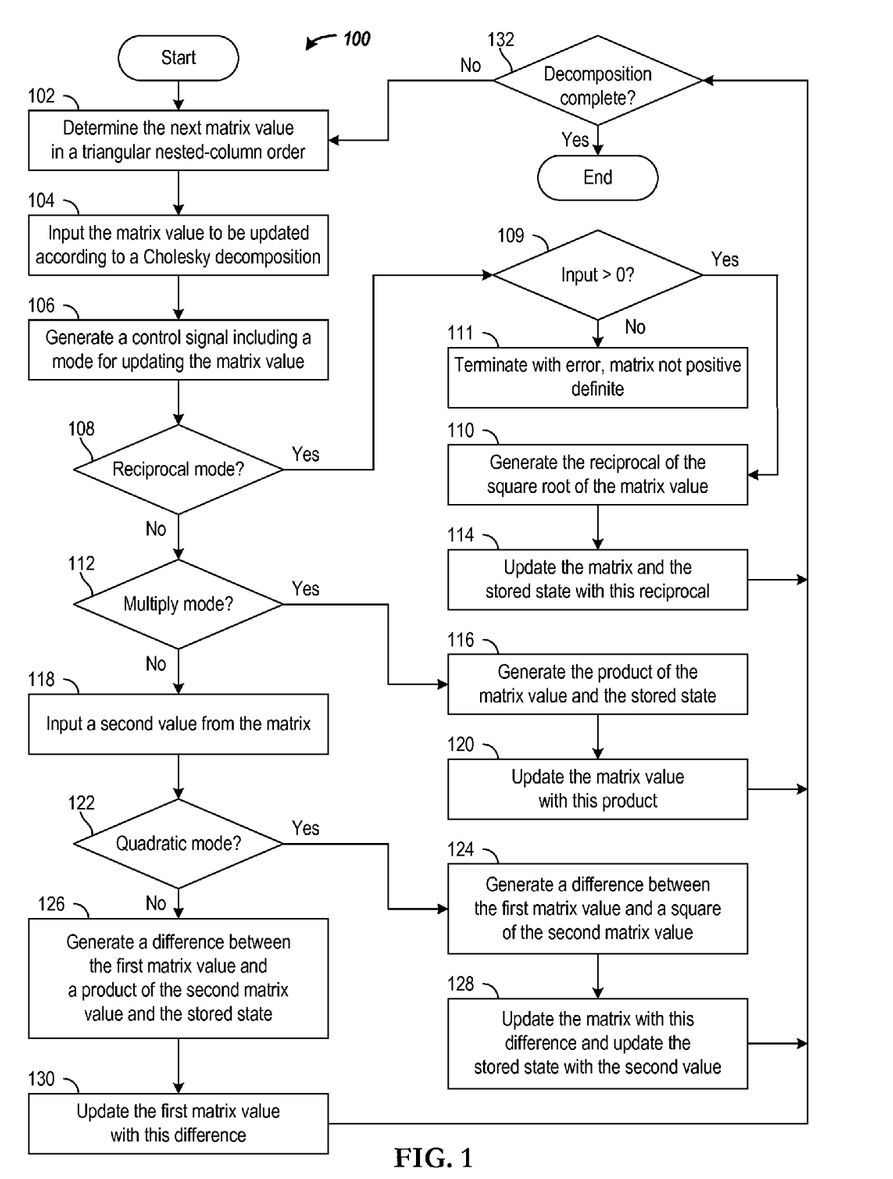
FIG. 1 is a flow diagram of a process for calculating a Cholesky decomposition of a matrix with a processing circuit having a single-cell architecture.

FIG. 1 is a flow diagram of a process 100 for calculating a Cholesky decomposition of a matrix with a processing circuit having a single-cell architecture. The values of the matrix are iteratively updated until the final updated values become the Cholesky decomposition of the matrix. Because the matrix is Hermitian, the values in the lower triangular portion (or upper triangular portion) of the matrix fully define the matrix. In one embodiment, the values of the matrix in the lower triangular portion are iteratively updated until these values become the Cholesky decomposition of the matrix.

The values of the lower triangular n×n matrix are iteratively updated in the nested-column order. For each column of the matrix in the order of increasing column index k, the nested-column order successively includes the values in that column and the values in the more significant columns k+1 to n, and the nested-column order includes the values within each of these columns in the order of increasing row index. At block 102, the value of the next matrix element in the nested-column order is determined. In the nested-column order, the column with index k is denoted the current column and the columns with index k+1 to n are denoted the more significant columns.

At block 104, the value determined at block 102 is input to a circuit for calculating the Cholesky decomposition of the matrix. At block 106, a control signal is generated that indicates one of four operating states for the input value. The control signal is used in controlling the operating state of the processing circuit such that the processing circuit performs different computations on different matrix elements according to the operating state. As will be explained in subsequent figures, the state of the control signal will depend on the matrix elements being processed.

Decision block 108 checks whether the control signal indicates an inverse-square-root operating state. The inverse-square-root operating state is entered for processing the value of a matrix element that is the diagonal element of the current column. If the operating state is the inverse-square-root operating state, process 100 proceeds to decision block 109; otherwise, process 100 proceeds to decision block 112. At decision block 109, the process checks whether or not the input value is greater than zero. Thus, the process detects if the input matrix is not positive definite (i.e., positive-semi definite or negative definite). If the input matrix is not positive definite, the process terminates with an error at block 111 indicating that the input matrix is not positive definite. Otherwise, the process continues to block 110. At block 110, the inverse of the square root of the value of the matrix element is generated. At block 114, this inverse square root value is stored in a state register. In one embodiment, the element of the matrix is updated by setting the value of the matrix element to this inverse square root value. In another embodiment, the inverse square root value is output as part of the Cholesky decomposition and the matrix element is not updated because the state register provides the inverse square root value for subsequent calculations.

Decision block 112 checks whether the control signal indicates the operating state is a multiply operating state. The multiply operating state is entered for processing an off-diagonal element of the current column. If the operating state is the multiply operating state, process 100 proceeds to block 116; otherwise, process 100 proceeds to block 118. At block 116, a product is generated from the inverse square root value stored in the state register and the value of the matrix element. At block 120, the matrix element is updated by setting the value of the matrix element to this product.

Block 118 inputs a value of a second matrix element from the current column for updating a matrix element in a more significant column than the current column.

Decision block 122 checks whether the control signal indicates the operating state is a quadratic-multiply-add operating state. The quadratic-multiply-add operating state is entered for processing a matrix element that is a diagonal element of a more significant column than the current column. If the operating state is the quadratic-multiply-add operating state, process 100 proceeds to block 124; otherwise, process 100 proceeds to block 126. At block 124, a difference is generated between the value of the matrix element input at block 104 and a square of the value of the second matrix element input at block 118. At block 128, the matrix element is updated by setting the value of the matrix element to this difference, and the value of the second matrix element input at block 118 is stored in the state register.

The operating state for an off-diagonal element of a more significant column than the current column is a three-operand multiply-add operating state. At block 126 for the three-operand multiply-add operating state, a difference is generated between the value of the matrix element input at block 104 and a product of the value stored in the state register at block 128 and the value of the second matrix element input at block 118. At block 130, the value of the matrix element is updated with the computed difference.

Decision block 132 checks whether the decomposition is complete. In response to the decomposition being incomplete, process 100 returns to block 102 to update the value of the next matrix element in the nested-column order. If the decomposition is complete, the circuit outputs the Cholesky decomposition of the matrix in one embodiment.

Figure 2:
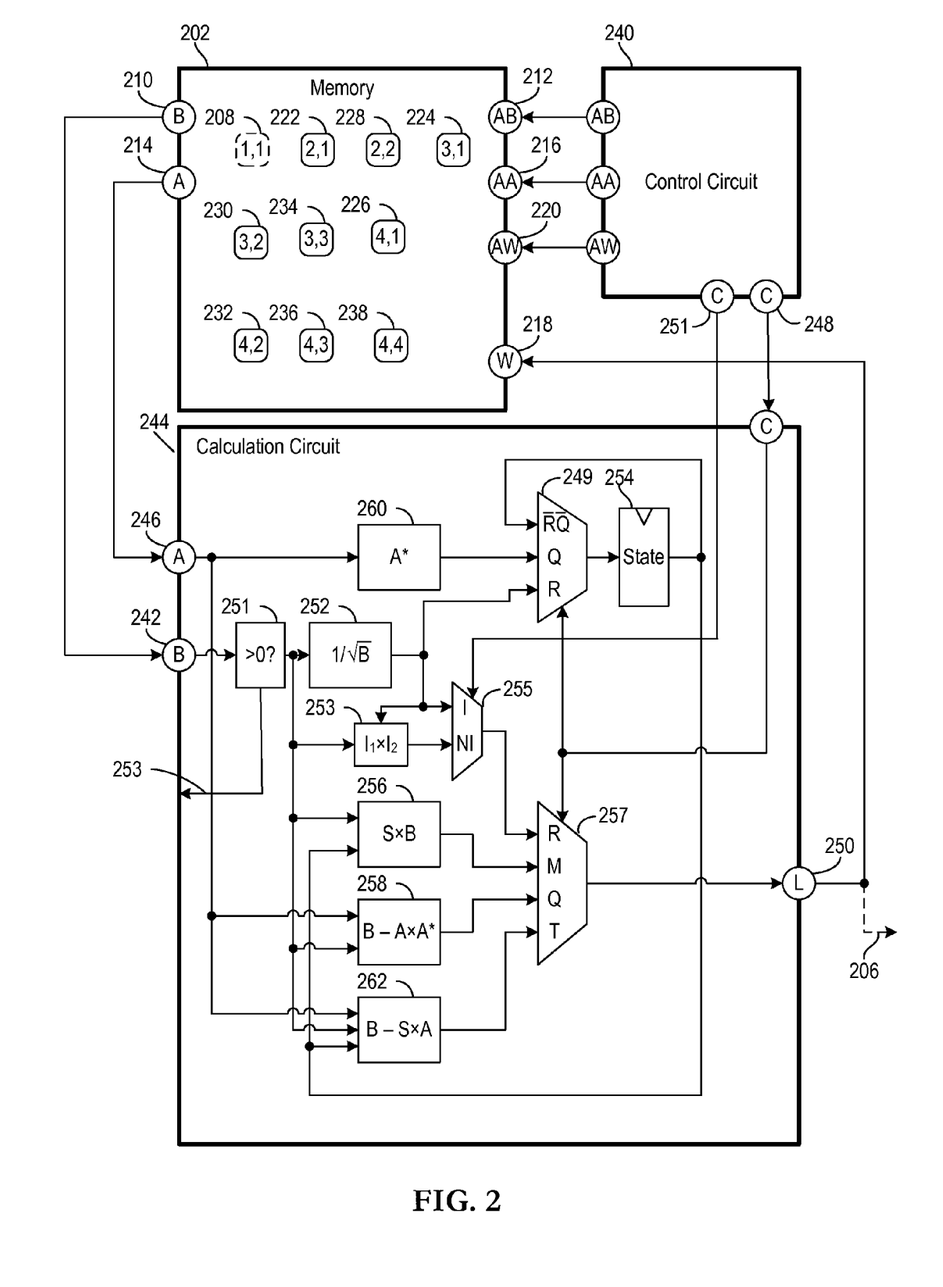
FIG. 2 is a block diagram of a circuit for calculating a Cholesky decomposition of a matrix.

FIG. 2 is a block diagram of a circuit for calculating a Cholesky decomposition of a matrix. The memory 202 generally stores intermediate updates for the matrix values. In one embodiment, the memory 202 stores the initial values of the matrix, and the matrix values are updated until the memory 202 stores the Cholesky decomposition of the matrix. The memory 202 has a first read access port including a data output port 210 and an address input port 212, and a second read access port including a data output port 214 and an address input port 216. The memory 202 also has a write access port including a data input port 218 and an address input port 220. The write access port may be merged into one or both of the read access ports in one embodiment. The memory stores the values, which are shown as blocks 208, 222, 224, 226, 228, 230, 232, 234, 236, and 238, in the memory 202. The particular arrangement of blocks 208, 222, 224, 226, 228, 230, 232, 234, 236, and 238 in the memory is for purposes of illustrating the decomposition. Those skilled in the art will recognize that the physical memory locations in which the values are stored would not necessarily correspond to the illustrated arrangement.

The control circuit 240 provides addresses to address input port 212 to read the values, which are represented by blocks 208, 222, 224, 226, 228, 230, 232, 234, 236, and 238, via the data output port 210, and to provide these values to the input 242 of the calculation circuit 244 in the nested-column order. The control circuit 240 also provides addresses to address input port 216 to read certain of these values from the respective locations via the data output port 214, and to provide these values to the input 246 of the calculation circuit 244.

The control circuit 240 generates a control signal at port 248 for controlling the calculation circuit 244. For ease of reference, the control signal is referred to as control signal 248. The calculation circuit 244 generates an updated matrix value at the output port 250 responsive to the control signal 248.

In response to the control signal 248 indicating an inverse-square-root operating state, greater-than-zero block 251 checks whether or not the input value is greater than zero for determining whether or not the input matrix is not positive definite. If the input matrix is not positive definite, an error signal 253 is generated to signal that the input matrix is not positive definite, and the processing of the input matrix may be terminated in response thereto. If the input value of the matrix element is greater than zero, circuit 252 of the calculation circuit 244 generates the inverse of the square root of the value of the matrix element provided at input 242. This inverse square root value is selected by multiplexer 249 and stored in a state register 254 and output at output 250. In one embodiment, the control circuit 240 updates the value of the matrix element in memory 202 by setting the value of the matrix element to this inverse square root value.

In one embodiment, the calculation circuit 244 is configurable to operate in one mode in which the inverse of the square root of the input value is output, or to operate in another mode in which the square root of the input value is output. This function is provided by multiplier 253 and multiplexer 255, which is controlled by control signal 251. Multiplier 253 multiplies the value of the matrix element provided at input 242 by the output of the inverse square root circuit 252. In response to having been configured to provide the inverse square root value, multiplexer 255 selects the input at port I. In response to having been configured to provide the square root value, the multiplexer 255 selects the input from port NI. The output is provided to the multiplexer 257.

In response to the control signal 248 indicating a multiply operating state, circuit 256 of the calculation circuit 244 generates a product of the inverse square root value stored in the state register 254 and the value of the matrix element provided at input 242. This product is selected by multiplexer 257 and output at output 250. The control circuit 240 updates the value of the matrix element in memory 202 via the write port, including setting the matrix element to this product by writing the respective location for the matrix element in memory 202 with the product output from calculation circuit 244 in response to the control signal 248 indicating the multiply operating state.

In response to the control signal 248 indicating a quadratic-multiply-add operating state, circuit 258 of the calculation circuit 244 generates a difference between the value of the matrix element provided at input 242 and a square of the value of the matrix element provided at input 246. This difference is selected by multiplexer 257 and output at output 250. The control circuit 240 updates the matrix element in memory 202 via the write port, including setting the matrix element to this difference by writing the respective location for the matrix element in memory 202 with the difference that is output from calculation circuit 244 in response to the control signal 248 indicating the quadratic-multiply-add operating state. In one embodiment, the matrix elements include complex values, and circuit 260 of the calculation circuit 244 generates a complex conjugate of the value of the matrix element provided at input 246, and is selected by multiplexer 249 and stored in the state register 254. Circuit 258 generates the square that is a product of the matrix value provided at input 246 and the conjugate optionally provided from circuit 260. The matrix value provided at input 246 is stored in the state register 254 as the complex conjugate provided from circuit 260. In another embodiment, the matrix elements 208, 222, 224, 226, 228, 230, 232, 234, 236, and 238 have real values and the value of the matrix element provided at input 246 is stored in the state register 254.

In response to the control signal 248 indicating a three-operand multiply-add operating state, circuit 262 of the calculation circuit 244 generates a difference between the value of the matrix element provided at input 242 and a product of the value stored in the state register 254 and the value of the matrix element provided at input 246. This difference is selected by multiplexer 257 and output at output 250. The control circuit 240 updates the matrix element in memory 202 via the write port, including setting the matrix element to this difference by writing the respective location for the matrix value in memory 202 with the difference in response to the control signal 248 indicating the three-operand multiply-add operating state.

The Cholesky decomposition of the matrix includes each inverse square root value that is output at the output 250 of the calculation circuit 244 in response to the control signal 248 indicating the inverse-square-root operating state, and each product that is output at the output 250 of the calculation circuit 244 in response to the control signal 248 indicating the multiply operating state. The decomposition values may be output at 206.

In one embodiment, a multiplication circuit and an addition-subtraction circuit of a complex multiply accumulator (not shown) may be used to implement circuits 256, 258, and 262. The multiplication circuit generates the product in response to the control signal 248 indicating the multiply operating state. The multiplication circuit generates the square in response to the control signal 248 indicating the quadratic-multiply-add operating state. The multiplication circuit generates the other product in response to the control signal 248 indicating the three-operand multiply-add operating state. The addition-subtraction circuit generates the difference in response to the control signal 248 indicating the quadratic-multiply-add operating state, and the difference in response to the control signal 248 indicating the fourth three-operand multiply-add operating state.

Figure 3:
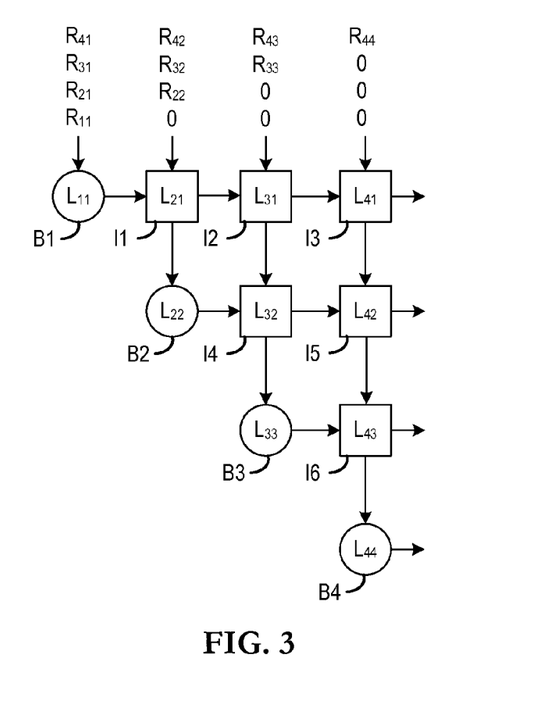
FIG. 3 shows a triangular systolic array for Cholesky decomposition in which folding of the cells allows a single cell architecture to be implemented.

FIG. 3 shows a triangular systolic array for Cholesky decomposition in which folding of the cells allows a single cell architecture to be implemented. The single cell architecture is derived by folding the triangular architecture. The single cell architecture fully exploits inherent parallelism and provides a high throughput implementation of the Cholesky decomposition.

There are two basic cells in the triangular architecture of FIG. 3, boundary cells (BCs) and internal cells (ICs). Boundary cells are shown as circles, and internal cells are shown as squares. Boundary cells are identified as B1, B2, B3, and B4, and the internal cells are identified as I1, I2, I3, I4, I5, and I6.

The BCs have two modes of operation, one mode for diagonal elements of the matrix and one mode for off-diagonal elements of the matrix. Likewise, the ICs have two modes of operation, one for diagonal elements of the matrix and one mode for off-diagonal elements of the matrix. To account for the different modes of operation by the BCs and ICs, the single cell architecture has four states of operation which are explained further in the diagram of FIG. 4. The data flow of inputting of matrix elements and the processing shown in FIG. 3 is replicated in the single cell architecture as explained further below.

In the triangular architecture, the processing of BCs B1-B4 and ICs 11-16 is generally in parallel, with the parallelism limited by the availability of the required input data to the cells. In the single cell architecture, the single cell performs the operations of the cells in the order of B1, I1, I2, I3, B2, I4, I5, B3, I6, and B4.

Figure 4:
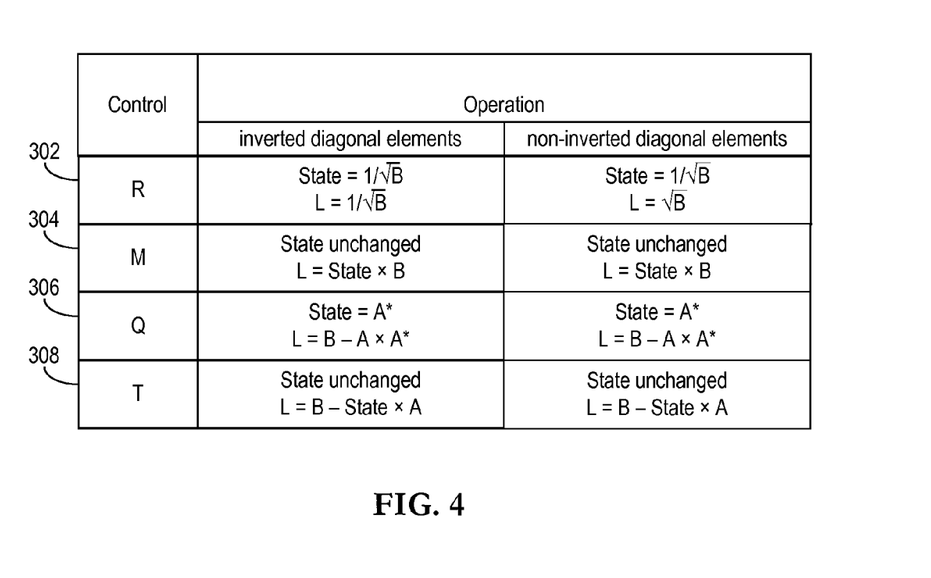
FIG. 4 is a diagram illustrating operation of the calculation circuits of FIGS. 2 and 5.
Figure 6:
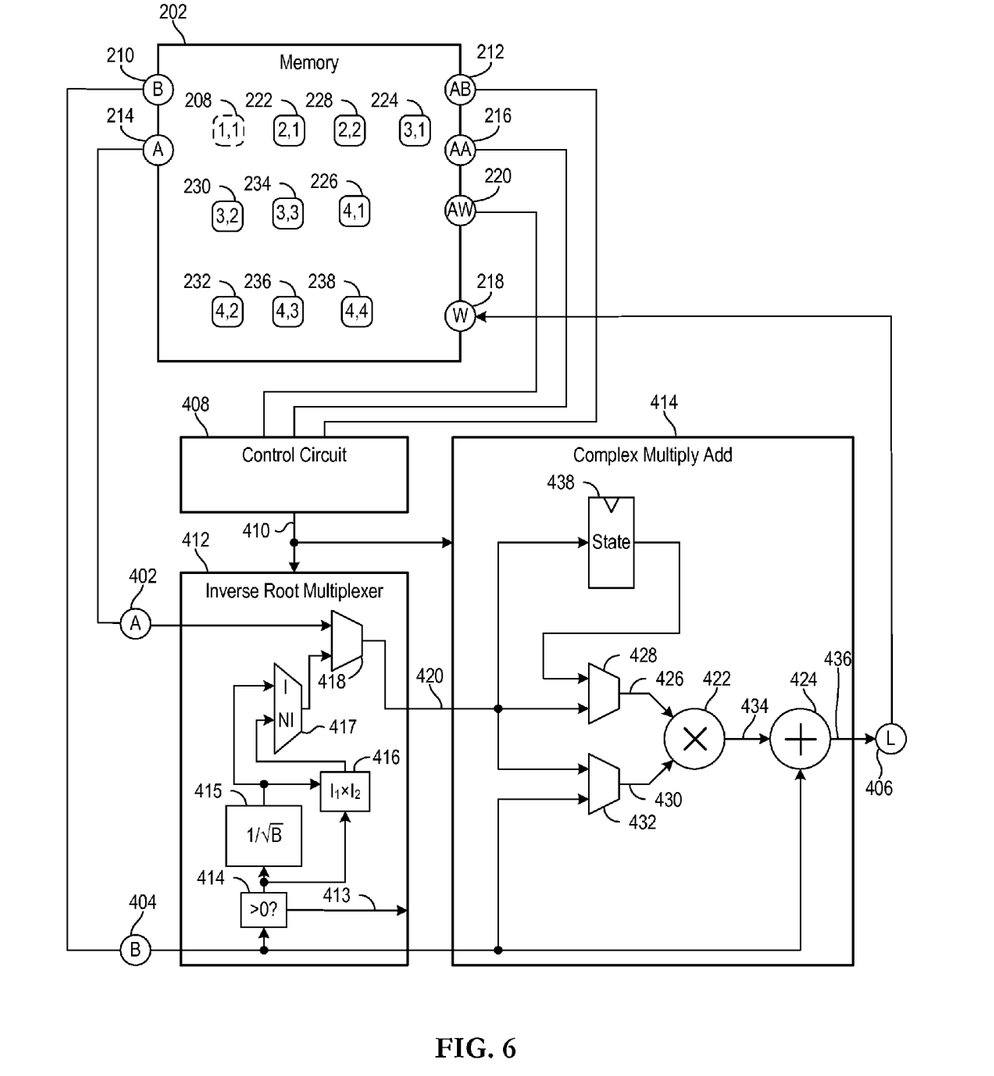
FIG. 6 is a diagram of a calculation circuit for iteratively generating a Cholesky decomposition of a matrix.

FIG. 4 is a diagram illustrating operation of the calculation circuits of FIGS. 2 and 6. The four control signal states R, M, Q, and T, represent, respectively, inverse (Reciprocal) square root, Multiply, Quadratic multiply and add, and Three operand multiply and add. The four operating states are used in controlling the single-cell architecture, which is derived by folding the high throughput triangular architecture that has boundary cells and internal cells. Boundary cells are on the diagonal of the input matrix, and internal cells are cells other than cells on the diagonal. Each of the two types of cells has two modes of operation, one mode for the diagonal cells and another mode for the off-diagonal cells. This results in a total of four operating states: boundary cell-diagonal, boundary cell-off-diagonal, internal cell-diagonal, and internal cell-off-diagonal.

The control signal state R (inverse (Reciprocal) square root) corresponds to the boundary cell-diagonal mode of operation; the control signal state M (Multiply) corresponds to the boundary cell-off-diagonal mode of operation; the control signal state Q (Quadratic multiply and add) corresponds to the internal cell-diagonal mode of operation, and the control signal state T (Three operand multiply and add) corresponds to the internal cell-off-diagonal mode of operation.

In row 302 of FIG. 4, the operations are shown for both inverted outputs and non-inverted diagonal elements calculations for the boundary cell-diagonal mode. In the outputs inverted operating state, the calculation circuit generates an inverse of a square root of the value of a diagonal matrix element, and this inverse square root value is a diagonal value ($L_{ii}$) for the Cholesky decomposition of the matrix. The inverse square root value is also saved in a state register for use in a subsequent iteration. An additional state of the control signal 248 may be used to force the outputs inverted operating mode. The operations in outputs inverted and non-inverted diagonal elements modes are the same for operating states M, Q, and T as shown in the diagram in rows 304, 306, and 308.

For operating the circuit in the non-inverted diagonal elements mode, the calculation circuit generates a square root of the value of the matrix element input at port B. The square root value is saved in the state register for use in a subsequent iteration.

In row 304, the operations are shown for the boundary cell-off-diagonal mode, i.e., the multiply operating state M. In this mode, the calculation circuit multiplies the current state value by the value of a matrix element input at port B. The resulting product is for an off-diagonal matrix element for the Cholesky decomposition of the matrix.

In row 306, the operations are shown for the internal cell-diagonal mode, i.e., the quadratic-multiply-add operating state Q. In this mode, the calculation circuit generates a difference for a diagonal matrix element, and this difference is an intermediate update for the diagonal matrix element. The difference is between the value of the matrix element input at port B, and a product of the value of the matrix element input at port A and its conjugate. The conjugate of the value input at port A is saved as the current state value.

In row 308, the operations are shown for the internal cell-off-diagonal mode, i.e., the three-operand multiply-add operating state T. In this mode, the calculation circuit generates a difference for an off-diagonal matrix element, and this difference is an intermediate update for the off-diagonal matrix element. The difference is between the value of the matrix input at port B and a product of the value in the state register and the value of the matrix element input at port A. The state register remains unchanged in internal cell-off-diagonal mode.

Figure 51:
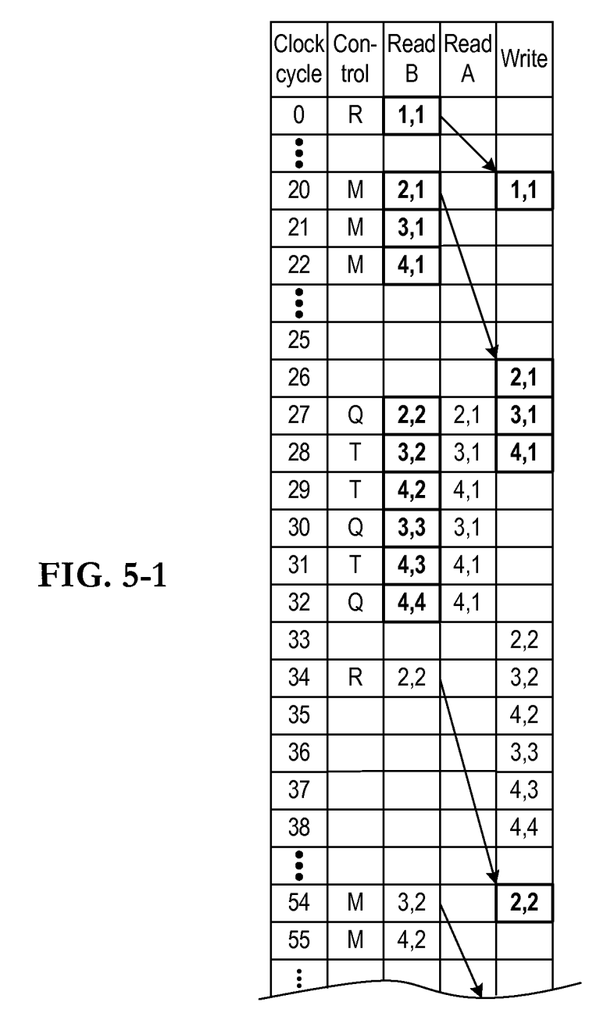
Figure 52:
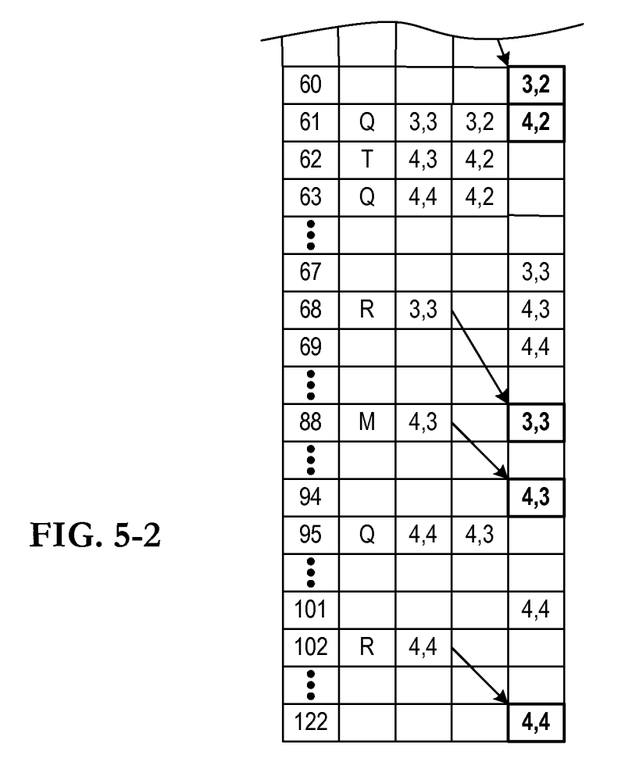

FIGS. 5-1 and 5-2 together show the timing of the data flow through a single-cell architecture for calculating a Cholesky decomposition of a matrix. The Clock cycle column enumerates the cycles in calculating the Cholesky decomposition. The Control column specifies the state of the control signal for controlling the operating state of the single-cell architecture. The Read B column shows the values of the matrix read for input to port B of the single-cell circuit, and the Read A column shows the values of the matrix read for input to port A of the single cell circuit. As may be referenced herein, the bold elements in the Read B column show the columnar order, and overall the Read B column shows the nested-column order. The bold elements in the Write column are the final values, L, of the Cholesky decomposition.

At clock cycle 0, the matrix element at row 1, column 1 is input for processing, and the operating state is for boundary cell processing of a diagonal element (R). Note that the order in which values of matrix elements are input corresponds to the order shown in the triangular architecture of FIG. 3. At the Read B column, initial values of the matrix elements are input at the appropriate time in the order of $R_{11}$, $R_{21}$, $R_{31}$, $R_{41}$, $R_{22}$, $R_{32}$, $R_{42}$, $R_{33}$, $R_{43}$, $R_{44}$ in clock cycles 0 through 32. Clock cycles between 0 and 20 are cycles in which the circuit waits for the inverse square root function to be computed. The latency for computing the inverse square root may vary from one implementation to another.

Once the inverse square root value is available at clock cycle 20, the circuit transitions into the operating state for performing boundary cell operations for off-diagonal matrix elements (operating state M, elements 2,1; 3,1; and 4,1). The boundary cell operations for off-diagonal elements involve multiplication of complex values by real values, and an example latency of 6 cycles is shown in the dataflow. The internal cell processing for diagonal matrix elements (operating state Q) and for off-diagonal elements (operating state T) is performed for matrix elements in the order shown in the data flow diagram.

This unique dataflow enables in-place computation for Cholesky decomposition of a matrix. For example, for a 4×4 matrix, the memory in which the matrix is stored has 10 locations to accommodate 10 matrix elements in the order of the computation ($R_{11}$, $R_{21}$, $R_{31}$, $R_{41}$, $R_{22}$, $R_{32}$, $R_{42}$, $R_{33}$, $R_{43}$, $R_{44}$). The same memory can be used to store the partial products (or intermediate values), thereby eliminating the need for a separate memory for the outputs. At clock cycle 25 in the data flow diagram, the decomposition value $L_{11}$ (for non-inverse square root mode) is stored in the place of $R_{11}$ in the memory. Similarly, at clock cycle 26, decomposition value $L_{21}$ is available which can be stored in the place of $R_{21}$ and so on.

FIG. 6 is a diagram of a calculation circuit for iteratively generating a Cholesky decomposition of a matrix. Control circuit 408 iteratively distributes the matrix values read from memory circuit 202 to inputs 402 and 404 to produce updates for the matrix values and the final Cholesky decomposition of the matrix at output 406. Control circuit 408 generates a control signal on line 410 for controlling circuits 412 and 414. Control circuit 408 also generates address and control signals to the memory at ports 212, 216, and 220.

In one embodiment, the inverse root multiplexer circuit 412 is configurable to operate in one mode in which the inverse of the square root of the input value is output or to operate in another mode in which the square root of the input value is output. Circuit 412 includes a greater-than-zero block 414, an inverse-square-root circuit 415, multiplier circuit 416, and multiplexers 417 and 418. The greater-than-zero block 414 checks whether or not the input value is greater than zero for determining whether or not the input matrix is not positive definite. If the input matrix is not positive definite, an error signal 413 is generated to signal that the input matrix is not positive definite, and the processing of the input matrix may be terminated in response thereto. If the input value of the matrix element is greater than zero, the inverse-square-root circuit 415 generates an inverse of a square root of the matrix value provided at the input 404, and this inverse square root value is provided as an input to multiplier circuit 416 and to the multiplexer 417. Multiplier circuit 416 multiplies the value of the matrix element provided at input 404 by the output of the inverse square root circuit 415. In response to control signal 410 specifying to provide the inverse square root value, multiplexer 417 selects the input at port I. In response to control signal 410 specifying to provide the square root value, the multiplexer 417 selects the input from port NI. In response to the control signal 410 indicating an inverse-square-root or square-root operating state, multiplexer 418 forwards the value output from multiplexer 417 to the signal on line 420; otherwise, multiplexer 418 forwards a matrix value from input 402 to the signal on line 420.

Circuit 414 includes a multiplication circuit 422 and an addition circuit 424. The multiplication circuit 422 generates a product of a value provided at the input on line 426 from multiplexer 428 and a value provided at the input on line 430 from multiplexer 432. The input on line 426 is coupled to the output on line 418 of the inverse-square-root circuit 415 via multiplexers 416 and 428. The signal on line 434 couples the output of the multiplication circuit 422 to an input of the addition circuit 424, and the other input of the addition circuit 424 is coupled to the input 404. The addition circuit 424 (adder/subtractor) generates a difference between a value provided at the signal on line 434 and a value provided at the input 404, and the difference is output on line 436 and coupled to the output 406.

When the control signal 410 indicates the inverse-square-root operating state as shown in row 302 of FIG. 4, the control circuit 408 distributes a matrix value to the input of inverse-square-root circuit 415 via input 404, and distributes the inverse square root value from the output on line 418 to the output 406 via multiplexers 416 and 428, multiplication circuit 422 and an addition circuit 424. To achieve this, multiplication circuit 422 passes the input on line 426 to the signal on line 434, and addition circuit 424 passes the signal on line 434 to the output 406. Each time the control signal 410 indicates the inverse-square-root operating state, a final update is generated for a diagonal matrix value at output 406, and this final update is a diagonal value of the Cholesky decomposition of the matrix.

Circuit 414 also includes a state register 438. The input of state register 438 is coupled to the output 418 of the inverse-square-root circuit 415 for storing the inverse square root value for the diagonal matrix values. The input of state register 438 is coupled to input 404 of the calculation circuit for storing intermediate updates for the diagonal matrix values. Multiplexer 428 couples the output of state register 438 to input 426 of multiplication circuit 422 for receiving the inverse square root value and the intermediate values stored in state register 438.

In response to the control signal 410 indicating the multiply operating state as shown in row 304 of FIG. 4, the control circuit 408 distributes a matrix value to the input 430 of multiplication circuit 422 via multiplexer 432 and input 404, and the control circuit 408 distributes the value of state register 438 to input 426 of multiplication circuit 422 via multiplexer 428. The multiplication product from the output of multiplication circuit 422 is distributed to output 406 via addition circuit 424. To achieve this, addition circuit 424 passes the signal on line 434 to the output 406. Each time the control signal 410 indicates the multiply operating state, a final update is generated for an off-diagonal matrix value at output 406, and this final update is an off-diagonal value of the Cholesky decomposition of the matrix.

In response to the control signal 410 indicating the quadratic-multiply-add operating state as shown in row 306 of FIG. 4, the control circuit 408 distributes a matrix value to both inputs 426 and 430 of multiplication circuit 422 via multiplexers 416, 428, and 430 and input 402. The control circuit 408 also distributes another matrix value to an input of addition circuit 424 via input 404. The difference from addition circuit 424 is coupled to output 406. Each time the control signal 410 indicates the quadratic-multiply-add operating state, an intermediate update is generated for a diagonal matrix value at output 406.

In response to the control signal 410 indicating the three-operand multiply-add operating state as shown in row 308 of FIG. 4, the control circuit 408 distributes a matrix value to input 430 of multiplication circuit 422 via input 404, and a value of state register 438 to input 426 of multiplication circuit 422 via multiplexer 428. The control circuit 408 also distributes another matrix value to an input of addition circuit 424 via input 404. The difference from addition circuit 424 is coupled to output 406. Each time the control signal 410 indicates the three-operand multiply-add operating state, an intermediate update is generated for an off-diagonal matrix value at output 406.

Figure 7:
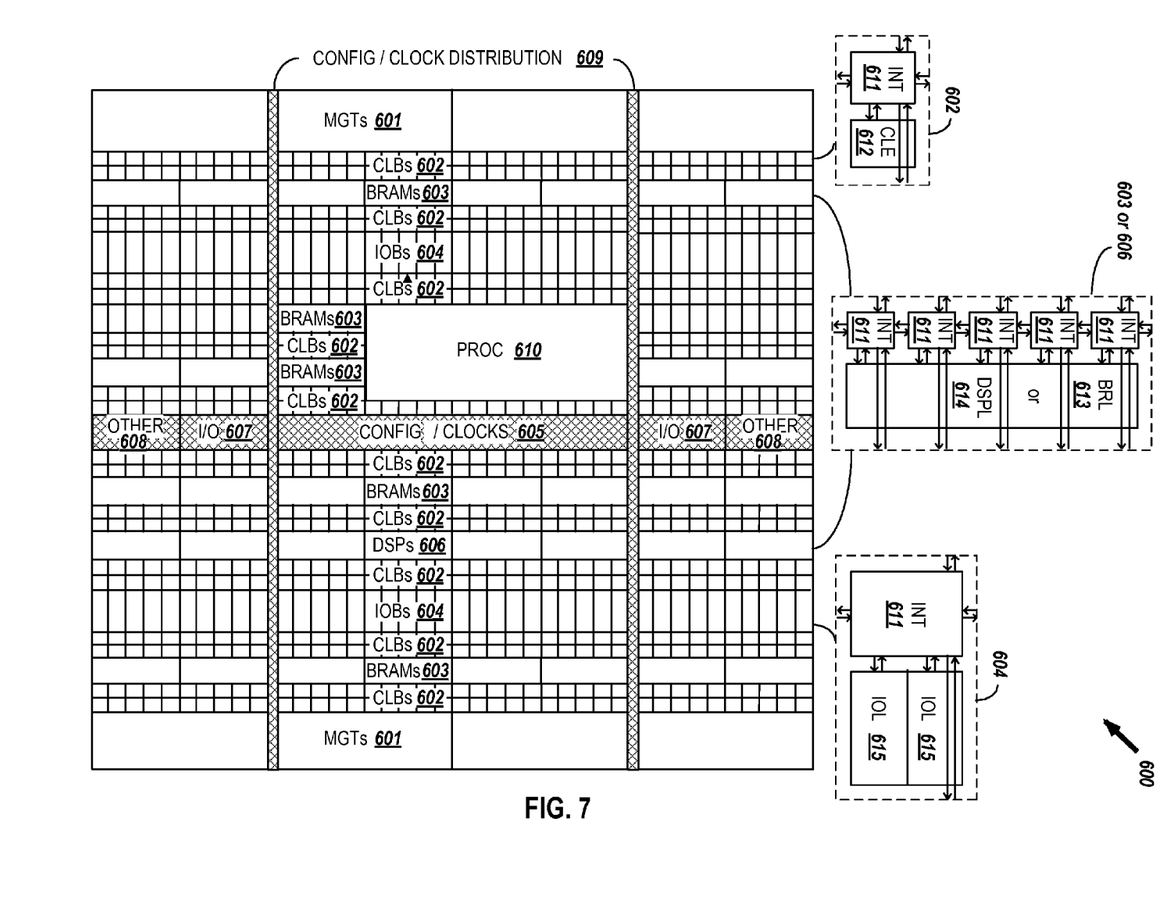
FIG. 7 is a block diagram of an example programmable logic integrated circuit that may be used in implementing circuitry for calculating a Cholesky decomposition of a matrix.

FIG. 7 is a block diagram of an example programmable logic integrated circuit that may be used in implementing circuitry for calculating a Cholesky decomposition of a matrix. The circuitry, as previously described, may be implemented on the programmable logic and interconnect resources of a programmable integrated circuit. Block memories (BRAMs) may be configured to implement the required memory and DSPs, which include multiply-accumulators, may be used to provide the multiply and add functions. For a matrix with complex values, 4 DSPs are used because a complex multiplication operation requires multiplying each complex and real part of one matrix value with each complex and real part of the other matrix value. A single DSP may be used for a matrix with real values.

FPGAs can include several different types of programmable logic blocks in the array. For example, FIG. 7 illustrates an FPGA architecture (600) that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), for example, e.g., clock ports, and other programmable logic 608 such as digital clock managers, analog-to-digital converters, system monitoring logic, and so forth. Some FPGAs also include dedicated processor blocks (PROC 610) and internal and external reconfiguration ports (not shown).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 7.

For example, a CLB 602 can include a configurable logic element CLE 612 that can be programmed to implement user logic plus a single programmable interconnect element INT 611. A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 7) is used for configuration, clock, and other control logic. Horizontal areas 609 extending from this column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block PROC 610 shown in FIG. 7 spans several columns of CLBs and BRAMs.

Note that FIG. 7 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA more than one adjacent column of CLBs is typically included wherever the CLBs appear, to facilitate the efficient implementation of user logic.

One or more embodiments are thought to be applicable to a variety of systems for Cholesky decomposition. Other aspects and embodiments will be apparent to those skilled in the art from consideration of the specification. The embodiments may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A circuit to calculate a Cholesky decomposition of a matrix, comprising:
   a first circuit having an input and an output, the first circuit configured to generate at the output an inverse of a square root of an input value provided at the input of the first circuit;

a second circuit having first and second inputs and an output, the second circuit configured to generate at the output, a product of a value provided at the first input and a value provided at the second input, wherein the first input is coupled to the output of the first circuit;

a third circuit having first and second inputs and an output, the third circuit configured to generate at the output a difference between a value provided at the first input and a value provided at the second input, wherein the first input is coupled to the output of the second circuit; and a control circuit coupled to the first, second, and third circuits, the control circuit configured to iteratively distribute a plurality of values of the matrix and the outputs of the first, second, and third circuits to the inputs of the first, second, and third circuits, wherein the output of the third circuit provides a plurality of values of the Cholesky decomposition of the matrix.

2. The circuit of claim 1, further comprising:
a state register;
  wherein:
    the control circuit is configured to generate a control signal having a first, a second, a third, and a fourth state;
    in response to the control signal indicating the first state, the control circuit is configured to distribute each value of the matrix to the input of the first circuit, and distribute the inverse square root value from the output of the first circuit to the output of the third circuit via the second and third circuits and store the inverse square root value as a current state value in the state register;
    in response to the control signal indicating the second state, the control circuit is configured to provide the current state value from the state register to the first input of the second circuit and distribute each value of the matrix to the second input of the second circuit, and distribute the product from the output of the second circuit to the output of the third circuit via the third circuit; and
    in response to the control signal indicating the third and fourth states, the control circuit is configured to distribute each value of the matrix to the second input of the third circuit.

3. The circuit of claim 2, wherein:
the control circuit is configured to generate the first state of the control signal for finally generating, at the output of the third circuit, each of a first plurality of diagonal ones of the plurality of values of the Cholesky decomposition of the matrix;
the control circuit is configured to generate the second state of the control signal for finally generating, at the output of the third circuit, each of the plurality of values of the Cholesky decomposition of the matrix except for the first plurality of the diagonal ones;
the control circuit is configured to generate the third state of the control signal for generating a respective intermediate update, at the output of the third circuit, for each of a second plurality of diagonal ones of the plurality of values of the matrix; and
the control circuit is configured to generate the fourth state of the control signal for generating a respective intermediate update, at the output of the third circuit, for each of the plurality of values of the matrix except for the second plurality of the diagonal ones.

4. The circuit of claim 1, further comprising a calculation circuit, comprising:
a first and a second input and an output;
wherein the first input of the calculation circuit is coupled to the first and second inputs of the second circuit;
the second input of the calculation circuit is coupled to the input of the first circuit, to the second input of the second circuit, and to the second input of the third circuit; and
the output of the third circuit is coupled to the output of the calculation circuit.

5. The circuit of claim 4, wherein the calculation circuit further comprises:
a state register having an input and an output;
wherein:
  the input of the state register is coupled to the first input of the calculation circuit for storing a plurality of intermediate updates for a plurality of diagonal ones of the plurality of values of the matrix, and the input of the state register is coupled to the output of the first circuit for storing the inverse square root value for the plurality of diagonal ones of the plurality of values of the matrix; and
  the first input of the second circuit is coupled to the output of the state register for receiving the plurality of intermediate values and the inverse square root value stored in the state register.

6. The circuit of claim 1, wherein the control circuit is further configured to sequence operations of the first, second, and third circuits such that the operations correspond to an ordering of processing of boundary cells and internal cells in a triangular systolic array, the triangular systolic array having m rows, and each row including a boundary cell as a first cell in the row and internal cells in other columns of the row, and the ordering of processing being from row 1 through row m of the triangular systolic array, and within each row operations of the boundary cell are followed in sequence by processing of the internal cells in the row.

7. A circuit to calculate a Cholesky decomposition of a matrix, comprising:
a memory configured for storing a first plurality of values for the matrix;
a calculation circuit coupled to the memory, the calculation circuit responsive to a control signal and having first and second inputs and an output, wherein:
  in response to the control signal indicating a first operating state, the calculation circuit is configured to generate for each first value provided at the second input, an inverse of a square root of the first value, store the inverse square root value in a state register, and output the inverse square root value at the output;
  in response to the control signal indicating a second operating state, the calculation circuit is configured to generate for each first value provided at the second input, a first product of the inverse square root value stored in the state register and the first value, and output the first product at the output;
  in response to the control signal indicating a third operating state, the calculation circuit is configured to generate for each first value provided at the second input, a first difference between the first value and a square of a second value provided at the first input, store the second value in the state register, and output the first difference at the output; and
  in response to the control signal indicating a fourth operating state, the calculation circuit is configured to generate for each first value provided at the second input, a second difference between the first value and a second product of the second value stored in the state register and a third value provided at the first input, and output the second difference at the output; and a control circuit coupled to the memory and to the calculation circuit, the control circuit configured to generate the control signal for the calculation circuit, wherein the control circuit is configured to read the second and third values from the first plurality of values stored in the memory, and provide the first plurality of values to the second input and the second and third values to the first input.

8. The circuit of claim 7, wherein the Cholesky decomposition of the matrix includes:
the inverse square root value that is output at the output of the calculation circuit for each first value for which the control signal indicates the first operating state, and
the first product that is output at the output of the calculation circuit for each first value for which the control signal indicates the second operating state.

9. The circuit of claim 7, wherein the calculation circuit includes a first, a second, and a third circuit, wherein:
the first circuit is configured to generate the inverse square root value of the square root in response to the control signal indicating the first operating state;
the second circuit is configured to generate the first product in response to the control signal indicating the second operating state, the square in response to the control signal indicating the third operating state, and the second product in response to the control signal indicating the fourth operating state; and
the third circuit is configured to generate the first difference in response to the control signal indicating the third operating state, and the second difference in response to the control signal indicating the fourth operating state.

10. The circuit of claim 7, wherein:
the first plurality of values for the matrix include a plurality of complex values; and
the calculation circuit is configured, responsive to the control signal indicating the third operating state, to generate the square that is a third product of the second value provided at the first input and a conjugate of the second value, and the calculation circuit is configured to store the second value in the state register as the conjugate of the second value.

11. The circuit of claim 7, wherein:
the control circuit is configured to update each first value for which the control signal indicates the second operating state, including writing a respective location for the first value in the memory with the first product that is output from the calculation circuit in response to the control signal indicating the second operating state;
the control circuit is configured to update each first value for which the control signal indicates the third operating state, including writing a respective location for the first value in the memory with the first difference that is output from the calculation circuit in response to the control signal indicating the third operating state; and
the control circuit is configured to update each first value for which the control signal indicates the fourth operating state, including writing a respective location for the first value in the memory with the second difference that is output from the calculation circuit in response to the control signal indicating the fourth operating state.

12. The circuit of claim 7, wherein:
the memory has a first and second access port and is configured to store the first plurality of values of the matrix in a plurality of respective locations;
the control circuit is configured to read each first value from the respective location via the first access port in a nested-column order and provide the first value to the second input of the calculation circuit in the nested-column order; and
the control circuit is configured to read the second and third values from the respective locations via the second access port and provide the second and third values to the first input of the calculation circuit.

13. The circuit of claim 12, wherein for each column of a plurality of columns of the matrix, the nested-column order successively includes each first value in the column and each first value in each more significant one of the plurality of columns.

14. The circuit of claim 12, wherein the control circuit is configured to write the inverse square root value, the first product, and the first and second differences from the output of the calculation circuit via the first and second access ports to the respective location for the first value provided at the second input of the calculation circuit.

15. The circuit of claim 7, wherein the control circuit is further configured to sequence operations of the first, second, and third circuits such that the operations correspond to an ordering of processing of boundary cells and internal cells in a triangular systolic array, the triangular systolic array having m rows, and each row including a boundary cell as a first cell in the row and internal cells in other columns of the row, and the ordering of processing being from row 1 through row m of the triangular systolic array, and within each row operations of the boundary cell are followed in sequence by processing of the internal cells in the row.

16. A method to calculate a Cholesky decomposition of a matrix, comprising:
inputting values of elements of the matrix to a circuit for calculating the Cholesky decomposition of the matrix;
generating a control signal indicating one of a first, a second, a third, or a fourth operating state for each of the input values;
in response to the control signal indicating the first operating state:
generating an inverse square root value from a first one of the input values; and
storing the inverse square root value in a state register;
in response to the control signal indicating the second operating state:
generating a first product of the inverse square root value stored in the state register and the first one of the input values;
in response to the control signal indicating the third operating state:
generating a first difference between the first one of the input values and a square of a second one of the input values;
storing the second one of the input values in the state register;
in response to the control signal indicating the fourth operating state, generating a second difference between the first one of the input values and a second product of the second one of the input values stored in the state register and a third one of the input values; and
outputting the Cholesky decomposition of the matrix from the circuit.

17. The method of claim 16, further comprising:
- in response to the control signal indicating the second operating state, setting a matrix element corresponding to the first one of the input values to the first product;
- in response to the control signal indicating the third operating state, setting the matrix element corresponding to the first one of the input values to the first difference; and
- in response to the control signal indicating the fourth operating state, setting the matrix element corresponding to the first one of the input values to the second difference.

18. The method of claim 16, wherein the generating of the control signal indicating one of a first, a second, a third, or a fourth operating state for each first value of the matrix controls the generating and the storing such that the generating and the storing correspond to an ordering of processing of boundary cells and internal cells in a triangular systolic array, the triangular systolic array having m rows, and each row including a boundary cell as a first cell in the row and internal cells in other columns of the row, and the ordering of processing being from row 1 through row m of the triangular systolic array, and within each row, operations of the boundary cell are followed in sequence by processing of the internal cells in the row.

\* \* \* \* \*